United States Patent
Jeffer et al.

[11] Patent Number: 5,956,801
[45] Date of Patent: Sep. 28, 1999

[54] ARTICULATED WINDSHIELD WIPER BLADE ASSEMBLY AND REFILL KIT

[75] Inventors: Peter H. Jeffer, New York, N.Y.;
Michel Fernandes, E. Freetown, Mass.

[73] Assignee: New-View Windshield Wiper L.P., Freeport, N.Y.

[21] Appl. No.: 08/906,917

[22] Filed: Aug. 6, 1997

[51] Int. Cl.⁶ .................................................... B60S 1/38
[52] U.S. Cl. ............................. 15/250.452; 15/250.454; 15/250.451; 15/250.361; 30/241; 30/280
[58] Field of Search ................... 15/250.451, 250.452, 15/250.453, 250.454, 250.48, 250.001, 250.44, 250.361; 30/113, 233, 241, 242, 243, 280

[56] References Cited

U.S. PATENT DOCUMENTS

| | | | |
|---|---|---|---|
| 1,082,257 | 12/1913 | Astruck | 30/113 |
| 2,036,787 | 4/1936 | Zabriskie | 15/250.48 |
| 2,179,451 | 11/1939 | Horton | 15/250.33 |
| 3,099,031 | 7/1963 | Ludwig | 15/250.451 |
| 3,766,591 | 10/1973 | Soito | 15/245 |
| 3,958,295 | 5/1976 | Green et al. | 15/250.451 |
| 4,005,503 | 2/1977 | Petrick | 15/250.452 |
| 4,107,814 | 8/1978 | Vanden Berg et al. | 15/250.452 |
| 4,698,874 | 10/1987 | Fritz, Jr. | 15/250.33 |
| 5,392,488 | 2/1995 | Li | 15/250.451 |
| 5,655,251 | 8/1997 | Dileo et al. | 15/250.451 |

FOREIGN PATENT DOCUMENTS

| | | |
|---|---|---|
| 1033520 | 4/1953 | France . |
| 1047648 | 7/1953 | France . |
| 59350 | 1/1954 | France . |
| 138048 | 10/1981 | Japan . |
| 524165 | 7/1940 | United Kingdom ............. 15/250.451 |
| 636231 | 4/1950 | United Kingdom . |
| 2189383 | 10/1987 | United Kingdom . |

*Primary Examiner*—Gary K. Graham
*Attorney, Agent, or Firm*—Barlow, Josephs & Holmes, Ltd

[57] ABSTRACT

An improved articulated wiper blade assembly includes a wiper blade sub-assembly having a female and male spline portions, and an internal stake located within the spline channel for preventing longitudinal movement of the male spline within the female spline channel while still permitting journaled rotation of the male spline within the female spline. The stake is preferably located adjacent to one end of the wiper blade sub-assembly, whereby the wiper blade sub-assembly can be cut at the opposing end thereof to a shorter length without affecting the stake. The stake extends inwardly from the female spline channel into a transverse notch preformed in the body of the male spline and engages the inner walls of the notch to prevent longitudinal movement in either direction. However, the notch still permits rotation of the male spline around the stake. Additional staked fingers and corresponding notches can be utilized to further prevent longitudinal movement of the male spline. A retainer clip for securing the wiper assembly to the frame is located at one end of the wiper assembly, and the opposing end is shortened to a custom length without adversely affecting the retention stake. A wiper blade refill kit includes the improved articulated wiper blade assembly and further includes a guillotine-like cutting device for cutting the wiper blade assembly. The body portion of the guillotine cutter has an opening with an outer peripheral edge corresponding to the cross-sectional outline of the wiper blade sub-assembly.

12 Claims, 3 Drawing Sheets

ARTICULATED WINDSHIELD WIPER BLADE ASSEMBLY AND REFILL KIT

RELATED U.S. PATENT APPLICATIONS

The present application is related to co-pending application Nos. 08/781,277, and 08/708,669, both of which are titled Articulated Windshield Wiper Blade Assembly, and both of which are commonly assigned with the present invention.

BACKGROUND AND SUMMARY OF THE INVENTION

The instant invention generally relates to articulated windshield wiper blade assemblies, and more particularly to an articulated wiper blade assembly including an internal stake arrangement to retain the wiping element while still allowing articulation. The wiper blade assembly is intended to be utilized as a refill, and in this regard, the wiper blade assembly is provided in a maximum length whereby the wiper blade assembly can be cut down to any desired length. A refill kit includes the wiper blade assembly, and a cutting device for cutting the wiper blade assembly to the needed size.

Windshield wipers and wiper blade refills are typically provided in a variety of different lengths to accommodate different size frames. Although the provision of multiple sizes of blades is convenient to the end consumer, retailers are forced to carry all of the sizes and must stock extensive sections of valuable shelf space with numerous lengths of this single item. In this regard, it would be preferable to sell one maximum-sized refill so that less shelf space were required. The present invention relates specifically to articulated windshield wiper blade assemblies, and to refill assemblies for an articulated wiper blade assembly. In the known articulated wiper assemblies, the male spline is held from longitudinally sliding within the female spline channel on one, or both ends, by a stake, i.e. a punched finger of plastic which extends downwardly into the female spline channel. The staked finger engages the end wall of the male spline and prevents sliding of the male spline out of that respective end. Alternatively, an end cap, or end plug may be used to prevent sliding of the male spline out of a respective end. Still further, a retainer clip may be pushed into one end of the female spline to prevent the male spline from sliding out of the respective end of the female spline channel. These arrangements are effective for the sale of wiper blade assemblies having fixed lengths. However, such a dual-ended retaining arrangement is ineffective for the sale of a maximum length refill wiper blade assembly which must be cut at one end to a shorter size. Cutting of the prior art assemblies would result in the severing of one of the retention members and would thus permit the male spline to become disassembled from the female spline. Accordingly, there is a need for an improved retaining arrangement for use in a refill kit for articulated wiper blade assemblies.

In this regard, the instant invention provides an articulated wiper blade having an internal stake retention arrangement. More specifically, the improved articulated wiper blade assembly includes a wiper blade sub-assembly having a female and male spline portions, and an internal stake located within the spline channel for preventing longitudinal movement of the male spline within the female spline channel while still permitting journaled rotation of the male spline within the female spline. The stake is preferably located adjacent to one end of the length of the wiper blade sub-assembly, whereby the wiper blade sub-assembly can be cut at the opposing end thereof to a shorter length without affecting the retention stake. The stake more specifically comprises a rigid, staked finger element which extends inwardly from the female spline channel into a transverse notch in the body of the male spline. The staked finger engages with the inner walls of the notch to prevent longitudinal movement in either direction while the notch still permits rotation of the male spline around the stake. Additional staked fingers with corresponding notches can be utilized to further prevent longitudinal movement of the male spline. A retainer clip for securing the wiper assembly to the frame can thus be located at one end of the wiper assembly, and the opposing end can be shortened to a custom length without adversely affecting the staked retention members.

The wiper blade refill kit includes the improved articulated wiper blade assembly and further includes a guillotine-like cutting device for cutting the wiper blade assembly. The body portion of the guillotine cutter has an opening with an outer peripheral edge corresponding to the cross-sectional outline of the wiper blade sub-assembly. When the wiper blade sub-assembly is slidably received in close-fitting engagement through the opening, the wiper blade sub-assembly is substantially supported during cutting thereof to prevent deformation during cutting.

The articulated wiper blade assembly is installed by determining the needed length of the blade assembly, cutting the blade assembly to the needed length with the included cutter, and sliding the wiper blade assembly into the wiper frame.

Accordingly, among the objects of the instant invention are: the provision of an articulated wiper blade assembly; the provision of an articulated wiper blade assembly having an internal stake retention arrangement which allows an end of the blade assembly to be cut to any size without affecting retention, or rotation, of the male spline within the female spline; and the provision of a refill kit comprising a maximum sized wiper blade assembly and a cutter device for safely, accurately, and easily cutting the refill wiper blade to the needed size.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
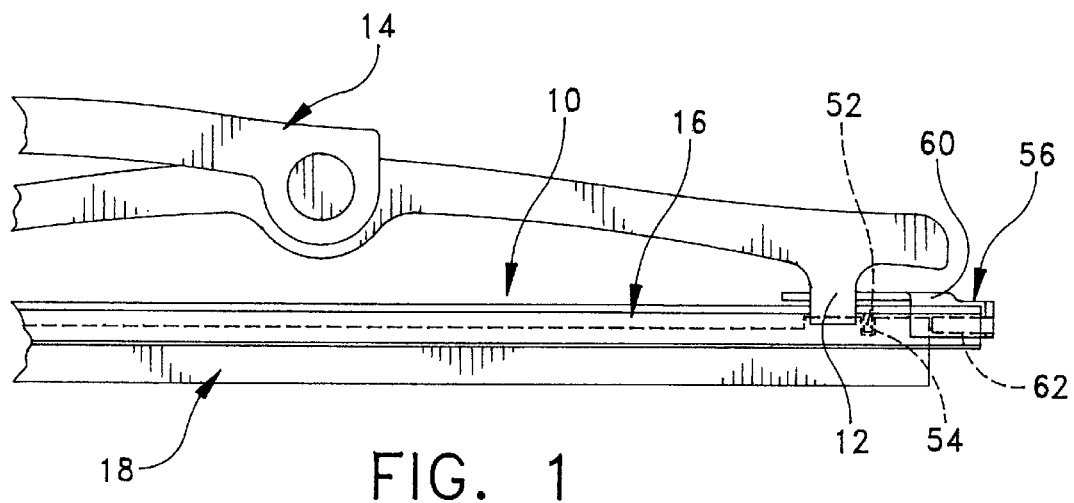
FIG. 1 is a fragmented, elevational view of an articulated wiper blade assembly of the present invention shown installed in a conventional wiper arm of a vehicle.
Figure 2:
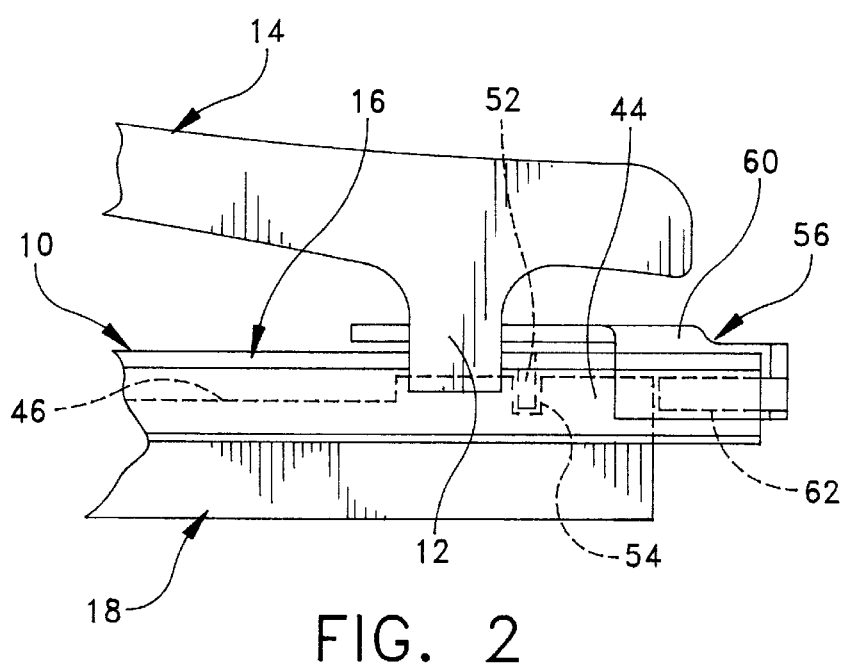
FIG. 2 is a similar view thereof, enlarged to illustrate in detail the staked retention arrangement.

Referring now to the drawings, the articulated wiper blade assembly of the instant invention is illustrated and generally indicated at 10 in FIGS. 1–6. As will hereinafter be more fully described, the instant articulated wiper blade assembly 10 is provided with a novel internal staking arrangement whereby one end of the blade assembly 10 can be shortened to a custom length without adversely affecting the staking arrangement. The invention further provides a refill kit including the wiper blade assembly 10 in accordance with the invention and a cutting device for cutting the blade to a custom length. The wiper blade assembly 10 is engineered for assembly in the clawed ends 12 of a wiper frame generally indicated at 14.

Figure 3:
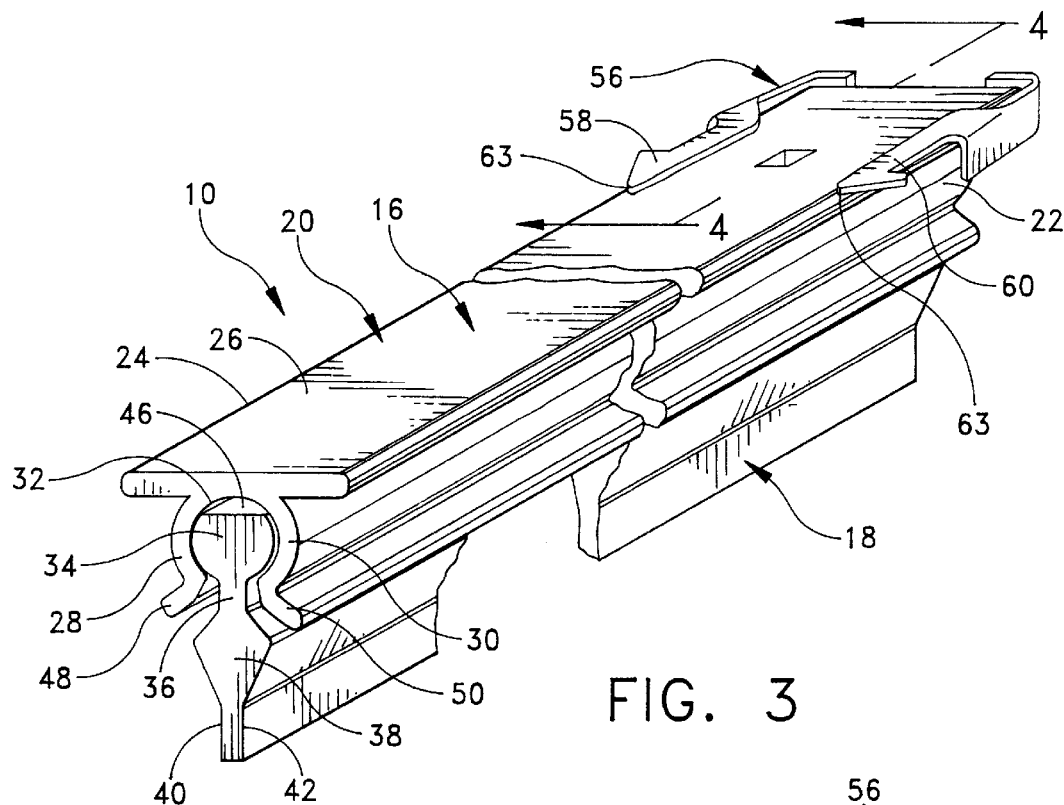
FIG. 3 is a fragmented perspective view of the articulated wiper blade assembly.
Figure 4:
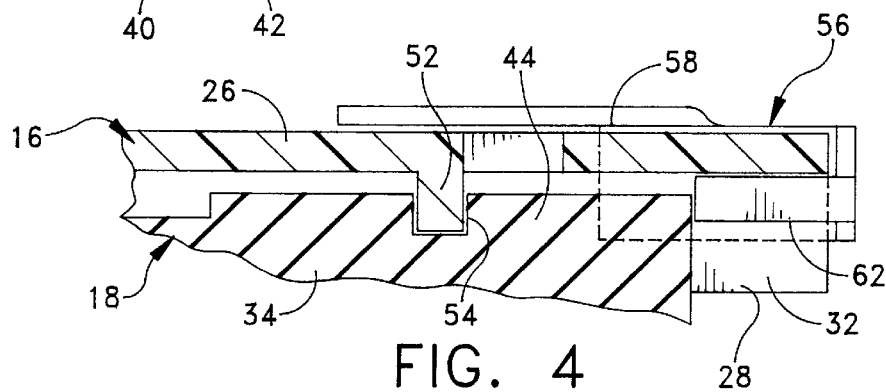
FIG. 4 is a cross-sectional view thereof taken along lines 4—4 of FIG. 3.

In general, the articulated wiper blade assembly 10 comprises an elongated polymeric female spline generally indicated at 16 and further comprises an elongated, elastomeric male spline generally indicated at 18. The female and male splines 16, 18 are assembled together to generally define a wiper blade sub-assembly generally indicated at 20 (FIG. 3). The wiper blade sub-assembly 20 is generally defined as having first and second opposing ends 22, 24 respectively.

The female spline 16 is formed from a relatively high durometer polymeric material (110–130 durometer on the Rockwell R scale) and includes a generally planar backbone 26, and two opposing arcuate spline legs 28, 30 respectively, which extend downwardly from the backbone 26 and cooperate with the backbone 26 to define a generally cylindrical spline channel 32.

The male spline 28 is formed from a relatively low durometer elastomeric material (55–65 durometer on the Shore "A" scale) and includes a cylindrical body portion 34 rotatably journaled within the spline channel 28 of the female spline 16. The male spline 18 further includes a neck portion 36 depending from the body portion 34, and a wiping portion 38 depending from the neck portion 36. The wiping portion 38 includes opposing wiping edges 40, 42 which are alternately engagable with a surface (not shown) to be wiped upon rotation of the male spline 18 within the spline channel 28. Alternatively, the male spline could comprise a dual-durometer construction, such as disclosed in the U.S. Pat. No. 4,689,874 to Fritz titled Windshield Wiper Blade.

The cylindrical body portion 34 of the male spline 18 has a substantially fully cylindrical end portion 44 at the first end 22 thereof, and is provided with a truncated uppermost edge surface 46 extending along substantially entirely along the rest of the length of the male spline 18. The truncated edge surface 46 is provided to reduce friction normally caused by a protruding mold lip (not shown) formed during molding. In conventional molding of elastomeric materials, a protruding mold lip is normally be created at the meeting point between the two mold halves. In molding the male spline 18, the mold lip is formed along the uppermost edge of the body portion 34. When the prior art male splines were journaled within the channel, the mold lip rubbed up against the inner wall of the channel creating friction and resistance to rotation. The truncated flat edge of the current design still includes a slight mold lip (not shown). However, the lip is now located in the center of the truncated surface 46 and no longer rubs against the inside wall of the channel 28. The truncated flat surface 46 further provides a discharge channel which can discharge debris and water outwardly at the end of the spline channel 28. Referring back to the cylindrical end portion 44, for purposes of the present description, the cylindrical end portion 44 is illustrated as being fully cylindrical. However, it is contemplated that the end portion 44 may alternatively be provided with a moderate or intermediate level of truncation, i.e. less than fully cylindrical but more fully cylindrical than the truncated portion 46, such that the mold lip problem as described above is addressed while also providing additional material for the stake to engage.

The lower terminal ends of each of the spline legs includes a flared edge stop generally indicated at respectively 48, 50 to limit rotation of the male spline 18. In this regard, opposing side surfaces of the neck and wiping portions 36, 38 of the male spline 18 engage with corresponding portions of the edge stops 48, 50.

The wiper blade assembly 10 further includes a novel staking arrangement for preventing longitudinal sliding movement of the male spline 18 within the female spline channel 28. More specifically, staking arrangement includes a rigid finger element 52 which extends inwardly into the spline channel 28 from the backbone 26 of the female spline 16 and a corresponding notch 54 formed in the male spline 18. More specifically, the notch 54 is formed within the cylindrical end portion 44 of the male spline 18. The rigid finger element 52 is preferably formed by a staking procedure wherein a punch tool (not shown) is punched, i.e. staked, downwardly through the backbone 26 of the female spline to form the finger element 52. The terminal end of the finger element 52 extends into and engages with the opposing inner walls of the transverse notch 54 whereby the finger element 52 and notch 54 cooperate to prevent longitudinal movement while permitting rotation of the spline 18 within the channel 28. The notch 54 is preferably formed within the cylindrical end portion 44 of the spline so that a deeper notch 54 is provided and the finger element 52 will have more material with which it can engage.

It is noted that the finger and notch, i.e. staking, arrangement is specifically illustrated and described as being located adjacent to one end of the assembly 10. This particular arrangement is preferred due to the fact that the opposing end of the assembly will be physically cut to customize the length of the wiper when being assembled with a particular length wiper arm frame. However, it is to be understood that the notch and stake can really be formed anywhere along the length of the spline so long as there is a minimum length of spline located on at least one side of the stake so that the assembly can be cut to the minimum length without affecting the staking arrangement. In an embodiment such as this, the substantially cylindrical portion 44 would be located in a central portion of the male spline 18, i.e. within the central ⅓ portion of the length of the wiper, with truncated spline portions 46 being located on both sides thereof. The notch 54 is still formed within the substantially cylindrical body portion 44 and the stake is arranged in corresponding relation on the female spline 16.

The assembly 10 further comprises a retainer clip generally indicated at 56 which is secured to a first end 22 of the female spline 16. The retainer clip 56 generally includes a pair of spaced spring legs 58, 60 which extend along the length of the backbone 26 of the female spline 16 and a pair of inwardly turned finger elements 62 which extend inwardly into the open end of the female spline channel 32. The finger elements 62 engage the inner walls of the spline channel 32 and hold the retainer clip 56 in a secured position on the end 22 of the wiper blade assembly 10. Barbed ends 63 of the spring legs 58, 60 engage with the claw ends 12 of the wiper frame 14 to hold the assembly 10 to the frame 14.

Figure 5:
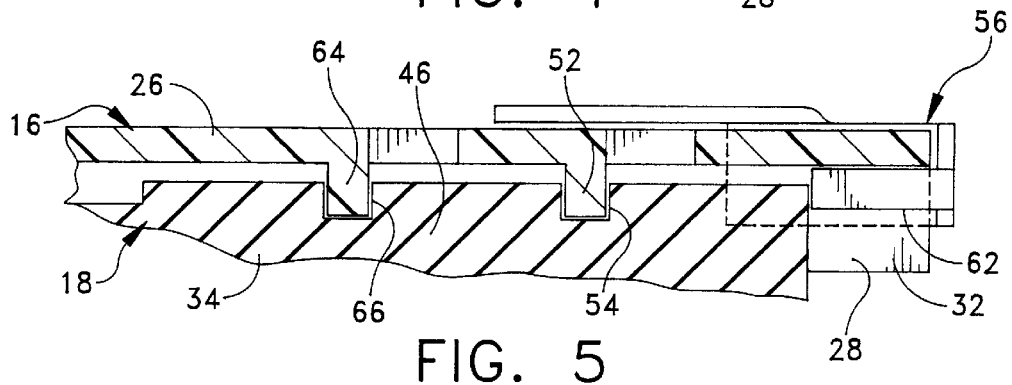
FIG. 5 is a similar cross-sectional view illustrating an alternative multiple stake arrangement.

Referring now to FIG. 5, an alternative staking arrangement is illustrated wherein a second staked finger 64 is formed in the female spline 16 and a second notch 66 is formed in the fully cylindrical portion 44 of the male spline 18. The second staking arrangement further prevents movement of the male spline and provides a redundant back-up to avoid longitudinal movement. Further alternative staking arrangements including additional stakes can be employed as well, if desired.

Figure 6:
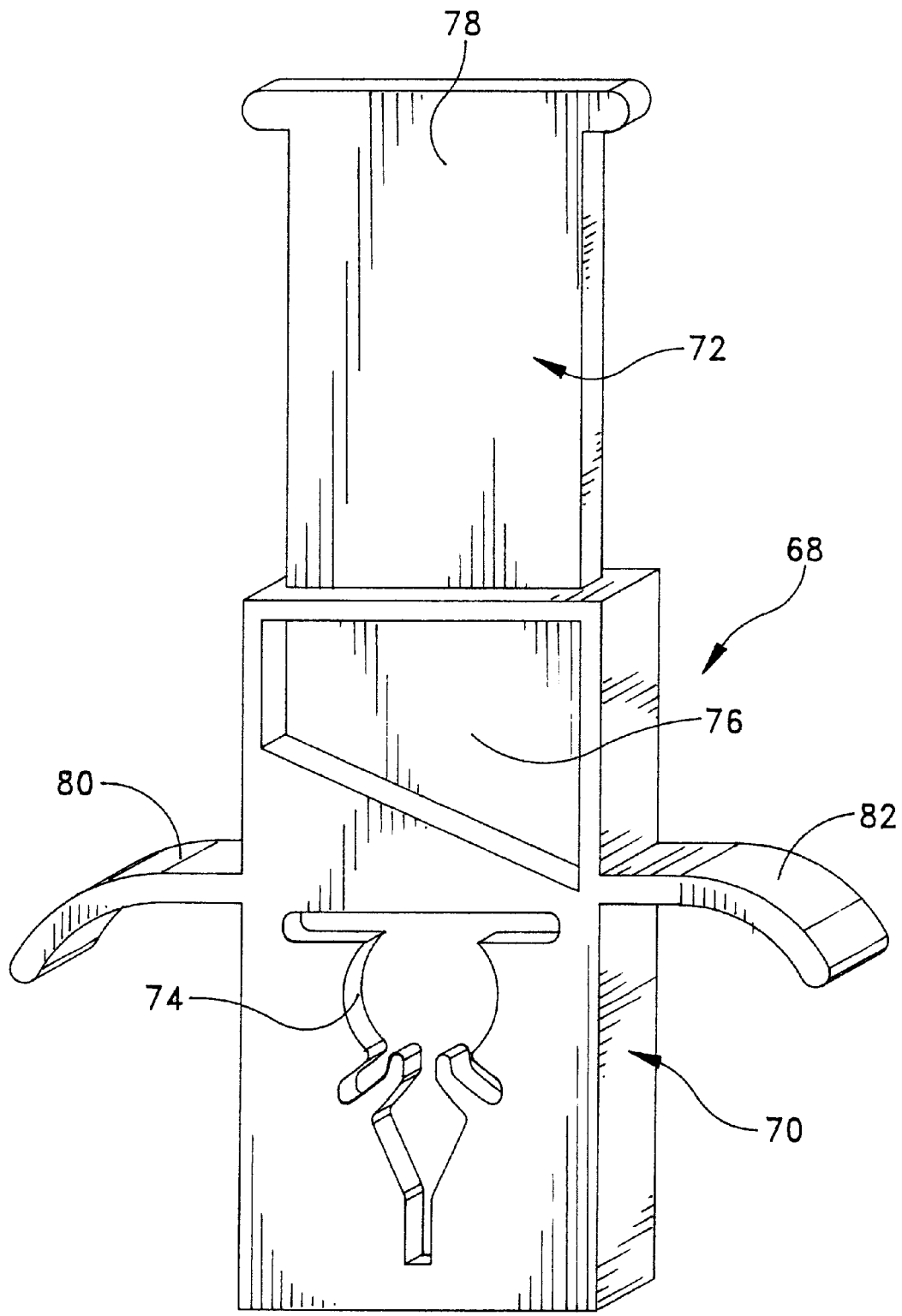
FIG. 6 is a perspective view of the cutting device for cutting the wiper blade assembly to the needed length.

Turning now to FIG. 6, a cutting device for cutting the wiper blade assembly is illustrated and generally indicated at 68. The cutting device 68 is effective for severing the second end 24 of the wiper blade assembly 10 to provide the correct length needed for installation. The cutting device 68 comprises a body portion generally indicated at 70, preferably fashioned from molded plastic, and a guillotine-type cutting blade generally indicated at 72. The body portion 70 includes an opening 74 therein which has a peripheral outline that corresponds to the cross-sectional outline of the assembled male and female splines 16, 18. In use, the second end 24 of the wiper blade assembly 10 is slidably received in close-fitting engagement through the opening 74 whereby the wiper blade assembly 10 is fully supported during cutting thereof. Full support of the peripheral edges of the wiper blade assembly 10 within the cutter is critically important in preserving the cylindrical configuration of the female spline channel 32 and male spline so that the male spline 18 can still rotate therein after cutting. If the wiper blade assembly 10 were significantly deformed during the cutting thereof, the male spline 18 may not properly rotate within the female spline 16 and affect operation of the wiper blade. The cutting blade 72 is mounted for sliding movement within the body portion 70 so that a cutting end 76 of the blade 72 passes through the opening 74. An actuator end 78 of the blade extends outwardly for actuating movement of the blade 72. The body portion 70 further includes a pair of opposed finger supports 80, 82 so that the cutting device 10 can be more easily manipulated. While a specific design of the present cutter 68 is illustrated and described, it is to be understood that various other design and configurations of the cutter could be developed from the concepts as described herein.

In accordance with the intended purpose of the invention, the articulated wiper blade assembly 10 and cutting device 68 are combined together and provided as a wiper blade refill kit for use by consumers. In sale of the kit, the articulated wiper blade assembly 10 is sold in a maximum length which is suitable for replacement of any of the currently available lengths of wiper blade. A length of 24 inches is currently contemplated as being effective for replacement of most available blade sizes, although lengths of up to 26 or 28 inches may also be made available for use on trucks. After determining the appropriate length for the replacement, the installer slides the cutting device 68 over the second end of the wiper blade assembly 10 and severs the excess portion of the blade assembly 10 from a main portion which is to be used as the refill. The remaining blade portion can then be installed in the claws 12 of the wiper arm 14 in a conventional manner as if purchased in that original size. Because the staking arrangement of the wiper blade assembly 10 is located on the first end 22 of the assembly 10, the second end 24 can be cut to the custom length needed without affecting operation or assembly of the wiper blade assembly.

While the present cutting device 68 and refill kit are specifically described in connection with an articulated wiper assembly, it is nevertheless contemplated that the maximum length refill wiper and cutting device concept can be equally applied to other more conventional types of wiper assemblies. For example, a conventional living hinge wiper including a rigid spline body and an elastomeric wiping element secured thereto could be provided in a single maximum length along with a suitable cutting device for cutting one end of the wiper to a needed length. This concept is entirely consistent with prior art wiper constructions which crimp the elastomeric wiping element to a rigid spline body in a plurality of positions along the length of the wiper. By strategically locating the crimps in the wiper, the wiper could conceivably be cut to shorter lengths without compromising the operation of the wiper.

It can therefore be seen that the instant invention provides an effective alternative to conventional wiper blade refills. The novel staking arrangement having a single internal stake and the provision of a cutting implement allows the refills kits to be sold in a single maximum length thereby reducing the shelf space at the retail level, and reducing manufacturing costs for producing multiple sizes of refill blades. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An articulated windshield wiper blade assembly comprising:

a wiper blade sub-assembly having first and second ends, said wiper blade sub-assembly including an elongated female spline having a cylindrical spline channel formed therein, and an elongated male spline having a generally cylindrical body portion which is rotatably journaled within said spline channel of said female spline; and interengaging retention means located within the spline channel for interengaging the male spline with the female spline to prevent longitudinal movement of the male spline within the female spline channel but still permit journaled rotation of said male spine therein, said interengaging retention means comprising a transverse notch in an upper body portion of said male spline and a corresponding rigid finger element extending inwardly from said female spline channel into said notch, said finger element extending downwardly into said notch from an upper surface of said female spline channel.

2. The wiper blade assembly of claim 1 wherein said interengaging retention means is located adjacent to said first end of said wiper blade sub-assembly whereby the wiper blade sub-assembly can be cut at the second end thereof to a shorter length without affecting said retention means.

3. The wiper blade assembly of claim 2, wherein said generally cylindrical body portion of said male spline has a substantially cylindrical section and further has a truncated portion extending along substantially entirely along the rest of the length of the male spline, said truncated portion defining a substantially continuous channel between the body portion of the male spline and the female spline, said notch being located within said fully cylindrical section of said male spline.

4. The wiper blade assembly of claim 1 wherein said interengaging retention means is located within a central portion of said wiper blade sub-assembly whereby the wiper blade sub-assembly can be cut at one end thereof to a shorter length without affecting said retention means.

5. The wiper blade assembly of claim 4, wherein said generally cylindrical body portion of said male spline has a substantially cylindrical section and further has a truncated portion extending along substantially entirely along the rest of the length of the male spline, said truncated portion defining a substantially continuous channel between the body portion of the male spline and the female spline, said notch being located within said fully cylindrical section of said male spline.

6. The wiper blade assembly of claim 1 wherein said retention means further comprises a second notch and a second corresponding rigid finger element extending inwardly and downwardly from an upper surface of said spline channel into said second notch.

7. An articulated windshield wiper blade assembly comprising:
   a wiper blade sub-assembly having first and second ends, said wiper blade sub-assembly including an elongated female spline having a cylindrical spline channel formed therein, and an elongated male spline having a generally cylindrical body portion which is rotatably journaled within said spline channel of said female spline said generally cylindrical body portion of said male spline having a substantially cylindrical section and further having a truncated portion extending along substantially entirely along the rest of the length of the male spline, said truncated portion defining a substantially continuous channel between the body portion of the male spline and the female spline; and
   interengaging retention means located within the spline channel for interengaging the male spline with the female spline to prevent longitudinal movement of the male spline within the female spline channel but still permit journaled rotation of said male spine therein,
   said interengaging retention means comprising a transverse notch in an upper body portion of said male spline and a corresponding rigid finger element extending inwardly from said female spline channel into said notch, said notch being located within said substantially cylindrical section of said male spline.

8. A refill kit for an articulated wiper blade assembly comprising in combination:
   a refill wiper blade assembly comprising a wiper blade sub-assembly having first and second ends, said wiper blade sub-assembly including an elongated female spline having a cylindrical spline channel formed therein, and an elongated male spline having a generally cylindrical body portion which is rotatably journaled within said spline channel of said female spline, and interengaging retention means located within the spline channel for interengaging the male spline with the female spline to prevent longitudinal movement of the male spline within the female spline channel but still permit journaled rotation of said male spine therein, said retention means being operable such that the wiper blade sub-assembly can be cut at one end thereof to a shorter length without affecting said retention means; and
   a cutting device for cutting the wiper blade sub-assembly, said cutting apparatus comprising a guillotine cutting device having a body portion with an opening for receiving the wiper blade sub-assembly therein, and a cutting blade slidably mounted in the body portion so as to sever the wiper blade sub-assembly at a predetermined location when the wiper blade sub-assembly is received though the opening in the body portion,
   said opening in said body portion having an outer peripheral edge corresponding to the peripheral outline of the wiper blade sub-assembly, whereby the wiper blade sub-assembly is slidably received in close-fitting engagement through the opening such that the wiper blade sub-assembly is substantially supported during cutting thereof.

9. A refill kit for an articulated wiper blade assembly comprising in combination:
   a refill wiper blade assembly comprising a wiper blade sub-assembly having first and second ends, said wiper blade sub-assembly including an elongated female spline having a cylindrical spline channel formed therein, and an elongated male spline having a generally cylindrical body portion which is rotatably journaled within said spline channel of said female spline, and interengaging retention means located within the spline channel for interengaging the male spline with the female spline to prevent longitudinal movement of the male spline within the female spline channel but still permit journaled rotation of said male spine therein, said retention means being operable such that the wiper blade sub-assembly can be cut at one end thereof to a shorter length without affecting said retention means,
   said interengaging retention means comprising a transverse notch in an upper body portion of said male spline and a corresponding rigid finger element extending inwardly from said female spline channel into said notch, said finger element extending downwardly into said notch from an upper surface of said female spline channel; and
   a cutting device for cutting the wiper blade sub-assembly.

10. The wiper blade assembly of claim 9 wherein said transverse notch and said finger element are located adjacent to one end of said wiper sub assembly.

11. A refill kit for an articulated wiper blade assembly comprising in combination:
   a refill wiper blade assembly comprising a wiper blade sub-assembly having first and second ends, said wiper blade sub-assembly including an elongated female spline having a cylindrical spline channel formed therein, an elongated male spline having a generally cylindrical body portion which is rotatably journaled within said spline channel of said female spline, said generally cylindrical body portion of said male spline having a substantially cylindrical section and further having a truncated portion extending substantially along the remaining length of the male spline, said truncated portion defining a substantially continuous channel between the body portion of the male spline and the female spline, said wiper blade sub-assembly further including interengaging retention means located within the spline channel for interengaging the male spline with the female spline to prevent longitudinal movement of the male spline within the female spline channel but still permit journaled rotation of said male spine therein, said retention means being operable such that the wiper blade sub-assembly can be cut at one end thereof to a shorter length without affecting said retention means, said retention means comprising a transverse notch in an upper body portion of said male spline and a corresponding rigid finger element extending inwardly from said female spline channel into said notch, said notch being located within said substantially cylindrical section of said male spline; and a cutting device for cutting the wiper blade sub-assembly.

12. The wiper blade assembly of claim 11 wherein said substantially cylindrical section of said male spline, said notch and said finger element are located adjacent to one end of said wiper sub-assembly.

\* \* \* \* \*